United States Patent Office 2,850,497
Patented Sept. 2, 1958

2,850,497

NEW BENZOIC ACID ALKAMINE ESTERS AND A PROCESS FOR THEIR MANUFACTURE

Gustav Ehrhart, Heinrich Ruschig, and Leonhard Stein, Bad Soden (Taunus), and Walter Aumüller and Leopold Ther, Frankfurt am Main, Germany, assignors to Farbwerke Hoechst Aktiengesellschaft vormals Meister Lucius & Brüning, Frankfurt am Main, Germany, a corporation of Germany No Drawing. Application September 27, 1954
Serial No. 458,708

Claims priority, application Germany October 1, 1953

1 Claim. (Cl. 260—247.2)

The present invention relates to new benzoic acid alkamine esters and a process for their manufacture.

It is already known that 4-butylamino-benzoyldimethyl-aminoethanol can be used with excellent success in surface anaesthesia.

Now we have found that new benzoic acid alkamine esters are obtained by treating a 2-chloro-4-amino-benzoic acid ester or a salt of the corresponding acid with an alkylating agent and reacting the 2-chloro-4-alkylamino-benzoic acid ester obtained or a salt of the corresponding acid with an amino-alcohol or a reactive derivative thereof, or by first reacting the 2-chloro-4-amino-benzoic acid ester or a salt of the corresponding acid with an amino-alcohol or a reactive derivative thereof and then alkylating the reaction products thus formed on the nitrogen directly attached to the ring.

The compounds thus produced correspond to the general formula:

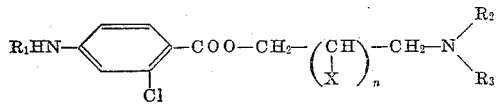

in which $R_1$ represents a low aliphatic, cycloaliphatic or aralkyl radical, $R_2$ and $R_3$ represent hydrogen, alkyl, aralkyl, cycloalkyl or, together with >N— the radical of a hydrogenated heterocyclic ring system and in which $n$ means 0 or 1 and X hydrogen or a hydroxyl group.

As 2-chloro-4-alkylamino-benzoic acids which are the basis for the esters or salts there come into consideration those compounds whose amino group is substituted by low alkyl, cycloalkyl or aralkyl radicals. As examples there may be named: 2-chloro-4-methylamino-benzoic acid, 2-chloro-4-ethylamino-benzoic acid, 2-chloro-4-propylamino-benzoic acid, 2-chloro-4-butylamino-benzoic acid, 2-chloro-4-hexylamino-benzoic acid, 2-chloro-4-cyclohexylamino-benzoic acid and 2-chloro-4-benzylamino-benzoic acid.

As esters of these acids there may be used especially the esters which are derived from aliphatic alcohols, such as methyl, ethyl, propyl, isopropyl, butyl, isobutyl, amyl, isoamyl, hexyl or octyl alcohol. It is advisable to use the methyl or ethyl ester.

As salts of the 2-chloro-4-aminobenzoic acid there are preferably used, owing to their greater solubility, the alkali metal or alkaline earth metal salts, such as the sodium, potassium, calcium or magnesium salts; however, other salts may likewise be used for the reaction. The salts may be introduced into the solvent in a finely pulverized form. A useful method of carrying out the present process consists in dissolving the alkylamino benzoic acids in isopropyl alcohol and preparing the metal salts by the addition of a metal alcoholate solution; in general, the metal salts are produced in a highly voluminous form.

As alkylating agents there may be used the compounds which are generally used in alkylation reactions. There may be named as examples the alkyl halides, such as methyl bromide, ethyl chloride and similar halides, and dialkyl sulfates, such as dimethyl sulfate, or dibutyl sulfate. The alkylation is, however, preferably performed by the action of aldehydes and hydrogen.

As amino-alcohols there may be used compounds of the general formula:

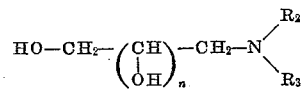

in which $n$ means 0 or 1 and $R_2$ and $R_3$ represent hydrogen or low molecular alkyl groups. There may, for instance, be named:

1-amino-ethanol-(2), 1-methylamino-ethanol-(2), 1-dimethylamino-ethanol-(2), 1-propylamino-ethanol-(2), 1-dipropylamino-ethanol-(2), 1-butylamino-ethanol-(2), 1-dibutylamino-ethanol-(2), 1-hexylamino-ethanol-(2), 1-cyclohexylamino-ethanol-(2), 1-benzylamino-ethanol-(2), 1-dibenzylamino-ethanol - (2), 1-methylamino-propanol-(3), 1-dimethylamino-propanol-(3), 1-ethylamino-propanol-(3), 1-diethylaminopropanol-(3), 1-propylamino-propanol-(3), 1-butylamino-propanol-(3), 1-cyclohexylaminopropanol-(3), 1-methylamino-propane-diol-(2:3), 1-dimethylamino-propanediol-(2:3), 1-diethylamino - propane-diol-(2:3), 1-butylamino-propane-diol-(2:3), 1-cyclohexylamino-propane-diol - (2:3), 1 - benzylamino-propanediol-(2:3).

$R_2$ and $R_3$ together with nitrogen may also represent members of a saturated heterocyclic ring system. There may, for instance, be mentioned:

1-piperidino-ethanol-(2), 1-morpholino-ethanol (2), 1-piperidino-propane-diol-(2:3), 1-pyrrolidino - propane-diol-(2:3) and 1-morpholino-propane-diol-(2:3). Compounds containing a 6-membered ring are preferably used.

As reactive derivatives of the afore-named alcohols there may preferably be used the esters with hydrohalic acids.

The reaction is carried out in known manner. Branched chain alcohols are suitably used as solvents. The use of isopropyl or isobutyl alcohol is especially favorable.

As condensing agents for the re-esterification there may be used alkaline substances, especially metal alcoholates. It is most practical to use aliphatic alcoholates, such as sodium methylate, sodium ethylate, sodium isobutylate, potassium ethylate or similar compounds. It is not necessary in this case that the metal alcoholate be derived from the same alcohol as is used as solvent.

When starting, in the manufacture of the compounds from the metal salts of the acids or from the acids themselves, the components are preferably reacted by dropwise addition of the solution of a reactive derivative of the amino-alcohol to a hot suspension of the metal salt or to a hot solution of the acid. It is suitable in this case to use as concentrated a solution as possible and to use the same solvent as serves for the preparation of the suspension of the metal salt or for the dissolution of the acids. In proportion to the dropwise addition, the metal salt of the acid is dissolved and the corresponding metal halide is separated, the reaction mixture becoming more and more mobile.

The 2-chloro-4-alkylamino-benzoic acid ester is isolated by filtering off the metal halide with suction and evaporating the filtrate under reduced pressure. The residue is dissolved in an acid, acetic acid being the preferred acid used. Neutral and acid portions are removed by extraction with solvents which are not miscible with water, for example ether, ethyl acetate, chloroform and others, and finally the free bases are liberated by the addition of alkalies, such as sodium or potassium carbonate.

The 2-chloro-4-alkylamino-benzoic acid esters of amino alcohols obtained by the process of the present invention form salts when acids are added and, in view of the solubility of the salts, they are used in this form. Inorganic and organic acids are suitable for causing the salt formation. As examples there may be named hydrohalic acids, such hydrochloric acid, hydrobromic acid or hydriodic acid; sulfuric acid, phosphoric acid, amidosulfonic acid; aliphatic mono- and polycarboxylic acids which may be saturated or unsaturated and, moreover, may also contain hydroxyl-groups, for example acetic acid, lactic acid, tartaric acid, citric acid, oxalic acid, succinic acid or maleic acid. Aromatic carboxylic acids, such as benzoic acid, salicylic acid or para-amino-salicylic acid, may also be used for the preparation of the salts.

The compounds of this invention are excellent anaesthetics, which are especially used in surface anaesthesia. The L. D.$_{50}$ of the 2-chloro-4-butylamino-benzoic acid dimethylamino-ethyl ester hydrochloride amounts to about 35 mg./kg. when the solution is administered by intravenous injection. The intravenous toxicity is, therefore, less than one third of that of the 4-butylamino-benzyl-dimethylamino-ethanol hydrochloride of which the L. D. amounts to about 10 mg./kg. The action as a surface anaesthetic of a solution of 0.02 percent strength of the 2-chloro-4-butylamino-benzoic acid dimethylamino-ethyl ester hydrochloride corresponds to that of a solution of 0.01 percent strength of the 4-butylaminobenzyl-dimethylaminoethanol hydrochloride. The chlorine-containing preparation is thus only half as active as the known surface anaesthetic. Its toxicity, however, amounts to less than one third of that of the known products.

The following examples serve to illustrate the invention, but they are not intended to limit it thereto.

Example 1

(a) A mixture of 60 grams of 2-chloro-4-aminobenzoic acid ethyl ester, 25 grams of butyraldehyde and 300 cc. of methanol is hydrogenated at 35° C. with Raney nickel and hydrogen. When the hydrogenation is complete, the catalyst is separated from the mixture by filtering it with suction and the filtrate evaporated. The crystalline residue is recrystallized from dilute alcohol. The 2-chloro-4-butylaminobenzoic acid ethyl ester melts at 64° C.

($b_1$) 50 grams of the 2-chloro-4-butylamino-benzoic acid ethyl ester obtained are mixed with 100 grams of dimethylamino-ethanol and after the addition of 5 cc. of sodium methylate solution of 5 percent strength the mixture is heated for 2 hours to 120° C. The excess of dimethylamino-ethanol is distilled off, the residue is taken up in dilute acetic acid and the solution is extracted by shaking with ether. The acetic acid solution is isolated and rendered alkaline with potassium carbonate. The base which has separated is taken up in ethyl acetate, the ethyl acetate solution is isolated and the ethyl acetate is distilled off. The residue is neutralized with alcoholic hydrochloric acid. When ether is added, the 2-chloro-4-butylamino-benzoic acid dimethylamino-ethyl ester hydrochloride crystallizes. It melts at 78° C.–79° C.

($b_2$) To 60 grams of 2-chloro-4-butylamino-benzoic acid ethyl ester and 120 grams of 1-dimethylamino-propanediol-(2:3) there are added 6 cc. of a sodium methylate solution of 5 per cent strength and the mixture is heated for 2 hours to 120° C. The 1-dimethylamino-propane-diol-(2:3) present in excess is distilled off and the residue is worked up in the manner described in paragraph $b_1$ above. The 2-chloro-4-butylamino-benzoic acid-γ-dimethylamino-β-hydroxy-propyl ester hydrochloride is dissolved in alcohol and after the addition of ethyl acetate until turbidity sets in it separates again in the form of crystals. The crystals thus obtained melt at 136° C.–138° C.

Example 2

(a) A mixture of 60 grams of 2-chloro-4-amino-benzoic acid ethyl ester, 20 grams of propionaldehyde and 300 cc. of methanol is hydrogenated at 40° C. with Raney nickel and hydrogen. When the absorption of hydrogen is complete, the catalyst is separated from the mixture by filtering it with suction and the filtrate evaporated. The 2-chloro-4-propylamino-benzoic acid ethyl ester obtained melts at 53° C.–54° C.

($b_1$) 30 grams of 2-chloro-4-propylamino-benzoic acid ethyl ester, 60 grams of dimethylamino-ethanol and 5 cc. of a sodium methylate solution of 5 percent strength are mixed and the mixture is heated for 2 hours to 110° C. The dimethylamino-ethanol present in excess is then distilled off. The residue is taken up in ethyl acetate and extracted by shaking with dilute acetic acid. The acetic acid solution is isolated, rendered alkaline with potassium carbonate and the base which has separated is taken up in ether. After the isolation of the ether solution the ether is distilled off. The residue is neutralized with alcoholic hydrochloric acid and the solution is mixed with ether. The 2-chloro-4-propylamino-benzoic acid dimethylamino-ethyl ester hydrochloride which separates in the form of crystals melts at 146° C.–148° C.

($b_2$) 30 grams of 2-chloro-4-propylamino-benzoic acid ethyl ester are mixed with 60 grams of 1-dimethylamino-propane-diol-(2:3) and after the addition of 3 cc. of a sodium methylate solution of 5 percent strength the mixture is heated for 2 hours to 120° C. The 1-dimethylamino-propane-diol-(2:3) present in excess is distilled off and the residue is taken up in dilute acetic acid and ether and thoroughly shaken. The acetic acid solution is isolated, rendered strongly alkaline with potassium carbonate solution and the oil which has separated is taken up in ether. The ethereal solution is isolated and concentrated. The residue is neutralized with alcoholic hydrochloric acid, and the solution is mixed with ether. After having been recrystallized from alcohol and ethyl acetate the 2-chloro-4-propylamino-benzoic acid-γ-dimethylamino-β-hydroxypropylester hydrochloride melts at 115° C.–117° C.

Example 3

100 grams of 2-chloro-4-butylamino-benzoic acid methyl ester (obtained according to the method described in Example 1a) are mixed with 200 grams of morpholinoethanol and after the addition of 10 cc. of a sodium methylate solution of 5 percent strength the reaction mixture is heated for 2 hours to 120° C. The morpholinoethanol in excess is distilled off under reduced pressure and the residue is taken up in ether and dilute hydrochloric acid and thoroughly shaken. The hydrochloric acid solution is isolated and rendered alkaline with potassium carbonate. The base which has separated is taken up in ether, the ethereal solution is isolated and dried with sodium sulphate. The ether in excess is distilled off and the residue is neutralized with alcoholic hydrochloric acid. After recrystallisation from isopropanol the crystalline 2-chloro-4-butylamino-benzoic acid morpholinoethyl ester hydrochloride melts at 118–120° C.

Example 4

100 grams of 2-chloro-4-butylamino-benzoic acid methyl ester (obtained according to the method described in Example 1a) are mixed with 200 grams of piperidinoethanol and 10 cc. of a sodium methylate solution of 5 percent strength and the reaction mixture is then heated for 2 hours to 110–120° C. The piperidinoethanol in excess is distilled off and the residue is taken up in ether and in dilute acetic acid. The acetic acid solution is isolated and rendered strongly alkaline with potassium carbonate. The base which has separated is taken up in ether. The ethereal solution is dried and the ether in excess is distilled off. The residue is neutralised with alcoholic hydrochloric acid and ether is added. The 2-chloro-4-butylamino-benzoic acid-piperidino-ethyl ester hydrochloride obtained melts at 115–117° C.

Example 5

30 grams of 2-chloro-4-butylaminobenzoic acid (obtained according to the method described in Example 1a) are dissolved in 100 cc. of isopropanol and a solution of 3.03 grams of sodium in 150 cc. of isopropanol is added. After the addition of 20 grams of butylaminoethyl chloride, the whole is boiled for 4 hours under reflux. After cooling, the sodium chloride is separated from the mixture by filtering it with suction and the mother liquor is concentrated under reduced pressure until dry. The residue is taken up in ether and shaken with dilute acetic acid. The isolated acetic acid solution is rendered alkaline with potassium carbonate and the base which has separated is taken up in ether. The ethereal liquid is separated and the ether in excess is distilled off. The residue is acidified with alcoholic hydrochloric acid whereby the 2-chloro-4-butylamino-benzoic acid butylaminoethyl ester hydrochloride crystallizes out. After recrystallisation from isopropanol the product melts at 180–182° C.

Example 6

21 grams of 2-chloro-4-butylaminobenzoic acid (obtained according to the method described in Example 1a) are introduced into a solution of 2.3 grams of sodium in 150 cc. of isopropanol. After addition of 11 grams of dimethylaminoethyl chloride the reaction mixture is boiled for several hours under reflux. The sodium chloride which has separated is filtered off with suction and the filtrate is concentrated under reduced pressure. The residue is taken up in ether and dilute acetic acid, the acetic acid solution is separated and rendered strongly alkaline with potassium carbonate. The base which has separated is taken up in ether. The ethereal solution is concentrated until dry and the residue is neutralized with alcoholic hydrochloric acid. Upon addition of ether the 2-chloro-4-butylamino-benzoic acid dimethylaminoethyl ester hydrochloride separates in the form of crystals. It melts at 78–79° C.

Example 7

100 grams of dimethylaminoethanol and 6 cc. of a sodium methylate solution of 5 percent strength are added to 60 grams of 2-chloro-4-amino-benzoic methyl ester. The mixture is heated for 2 hours under reduced pressure to 120° C. The reaction product is taken up in ether and dilute acetic acid and is then shaken. The acetic acid solution is isolated and rendered alkaline with potassium carbonate. The 2-chloro-4-amino-benzoic acid dimethylaminoethyl ester separates as base in the form of crystals which melt at 146–148° C.

25 grams of the base obtained are dissolved in 200 cc. of methanol, are exactly neutralized with alcoholic hydrochloric acid and, after addition of 8.0 grams of butyraldehyde, are hydrogenated with palladium and hydrogen. When the absorption of hydrogen is complete, the catalyst is separated from the mixture by filtering with suction and the filtrate is concentrated under reduced pressure until dry. The residue is recrystallized from alcohol and ether. The 2-chloro-4-butylamino-benzoic acid dimethylaminoethyl ester hydrochloride melts at 78–79° C.

We claim:

The process for the manufacture of benzoic alkamine ester derivatives, which comprises catalytically hydrogenating a mixture of a lower alkyl ester of 2-chloro-4-amino-benzoic acid and an aliphatic aldehyde having at most 4 carbon atoms in methanol in the presence of Raney nickel at a temperature of from about 35 to about 40° C. to thereby form the corresponding lower alkyl ester of 2-chloro-4-mono-lower alkylamino-benzoic acid, and then transesterifying the alkylation product in the presence of an alkali metal alcoholate with a basically substituted alcohol of the general formula

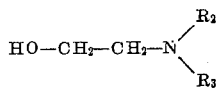

wherein $R_2$ and $R_3$ are members selected from the group consisting of hydrogen and alkyl radicals having at most 4 carbon atoms and together with the nitrogen atom are further members selected from the group consisting of piperidino, pyrrolidino and morpholino radicals.

References Cited in the file of this patent

UNITED STATES PATENTS

| | | |
|---|---|---|
| 1,396,913 | Bader | Nov. 15, 1921 |
| 1,889,645 | Eisleb | Nov. 29, 1932 |
| 2,460,139 | Marks et al. | Jan. 25, 1949 |

FOREIGN PATENTS

| | | |
|---|---|---|
| 1,047,364 | France | July 22, 1953 |